US012755106B2

(12) United States Patent
Chen et al.

(10) Patent No.: US 12,755,106 B2
(45) Date of Patent: Oct. 6, 2026

(54) METHOD FOR DETERMINING LOGICALITY OF DIALOGUE SENTENCES AND NON-TRANSITORY COMPUTER-READABLE MEDIUM

(71) Applicants: INVENTEC (PUDONG) TECHNOLOGY CORPORATION, Shanghai (CN); INVENTEC CORPORATION, Taipei City (TW)

(72) Inventors: Chin-Po Chen, Taipei City (TW); Jeng-Lin Li, Taipei City (TW); Wei-Chao Chen, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 147 days.

(21) Appl. No.: 18/984,497

(22) Filed: Dec. 17, 2024

(65) Prior Publication Data

US 2025/0384214 A1 Dec. 18, 2025

(30) Foreign Application Priority Data

Jun. 12, 2024 (CN) ......................... 202410758213.4

(51) Int. Cl.
*G06F 40/35* (2020.01)

(52) U.S. Cl.
CPC .................................. *G06F 40/35* (2020.01)

(58) Field of Classification Search
CPC ...................................................... G06F 40/35
See application file for complete search history.

(56) References Cited

U.S. PATENT DOCUMENTS

| | | | | |
|---|---|---|---|---|
| 12,626,691 | B1 * | 5/2026 | Monti | G10L 15/16 |
| 2020/0073941 | A1 * | 3/2020 | Canim | G06F 40/30 |
| 2026/0080190 | A1 * | 3/2026 | Jie | G06F 40/40 |

OTHER PUBLICATIONS

Chen et al.; Profiling Patient Transcript using Large Language Model Reasoning Augmentation for Alzheimer's Disease Detection; 2024 46th Annual International Conference of the IEEE Engineering and Biology Society. (Year: 2024).*

* cited by examiner

*Primary Examiner* — Abul K Azad
(74) *Attorney, Agent, or Firm* — Maschoff Brennan

(57) ABSTRACT

A method for determining logicality of dialogue sentences is provided. This method is performed by a processor, and includes the following steps: executing a large language model to generate a linguistic deficit profile according to a dialogue text and a prompt text, executing an embedding model to generate a first vector according to the linguistic deficit profile, executing a pre-trained language model to generate a plurality of second vectors according to the dialogue text, executing the pre-trained language model to concatenate the first vector with each second vector, and executing the pre-trained language model to generate a logicality determination result according to each second vector concatenated with the first vector.

10 Claims, 5 Drawing Sheets

METHOD FOR DETERMINING LOGICALITY OF DIALOGUE SENTENCES AND NON-TRANSITORY COMPUTER-READABLE MEDIUM

CROSS-REFERENCE TO RELATED APPLICATIONS

This non-provisional application claims priority under 35 U.S.C. § 119(a) on Patent Application No(s). 202410758213.4 filed in China on Jun. 12, 2024, the entire contents of which are hereby incorporated by reference.

BACKGROUND

1. Technical Field

The present disclosure relates to natural language processing, particularly to a method for determining the logicality of dialogue sentences and a non-transitory computer-readable medium.

2. Related Art

Recent deep learning models are applied to learn the underlying linguistic pattern from the transcripts. The Convolutional Neural Network (CNN) and Bidirectional Long Short-Term Memory (BLSTM) network architectures have shown discriminative power, and BERT-like models (BERT stands for (Bidirectional Encoder Representations from Transformers) further improve Alzheimer's Disease (AD) detection with fine-tuning techniques. These transcript-based detection methods involve less sensitive data than the risk of identity leakage in speech. However, the investigation of linguistic deficits is limited, as past studies only concern the linguistic pattern within an utterance for feature extraction, without the viewpoint from the understanding of a whole session. For example, the identified local low-level features such as pauses and punctuation can only characterize the deficits in an influent spoken utterance. Local low-level feature representation constrains the modeling ability for patient-level AD detection tasks, which biases the predictive models and limits the explainability. There is a research gap in generating global high-level representations that systematically summarize the sessional-level narrative.

SUMMARY

In light of the above descriptions, the present disclosure proposes a method for determining the logicality of dialogue sentences, thereby addressing the aforementioned issues.

According to one or more embodiment of the present disclosure, a method for determining logicality of dialogue sentences is provided. This method may be performed by a processor and includes following steps: executing a large language model to generate a linguistic deficit profile according to a dialogue text and a prompt text; executing an embedding model to generate a first vector according to the linguistic deficit profile; executing a pre-trained language model to generate a plurality of second vectors according to the dialogue text; executing the pre-trained language model to concatenate the first vector with each of the plurality of second vectors; and executing the pre-trained language model to generate a logicality determination result according to each of the plurality of second vectors concatenated with the first vector.

According to one or more embodiment of the present disclosure, a non-transitory computer-readable medium is configured to store a plurality of instructions. A plurality of operations is caused when the plurality of instruction is executed by a processor, and the plurality of instruction includes: executing a large language model to generate a linguistic deficit profile according to a dialogue text and a prompt text; executing an embedding model to generate a first vector according to the linguistic deficit profile; executing a pre-trained language model to generate a plurality of second vectors according to the dialogue text; executing the pre-trained language model to concatenate the first vector with each of the plurality of second vectors; and executing the pre-trained language model to generate a logicality determination result according to each of the plurality of second vectors concatenated with the first vector.

In view of the above, the core concept of the present disclosure is augmenting the information of text-form input by LLM for the downstream tasks. To this end, the present disclosure proposes a summary embedder to generate both the linguistic deficit profile and performance augmenting embedding. The performance augmenting embedding improves the accuracy of the downstream machine learning model, and the linguistic deficit profile explains the issues with the participants' logicality. The model and method proposed in the present disclosure may quickly detect the logicality of participants' sentences, with the required input being only the dialogue transcribed in text form. The output of the present disclosure is a logicality determination result with a linguistic deficit profile.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
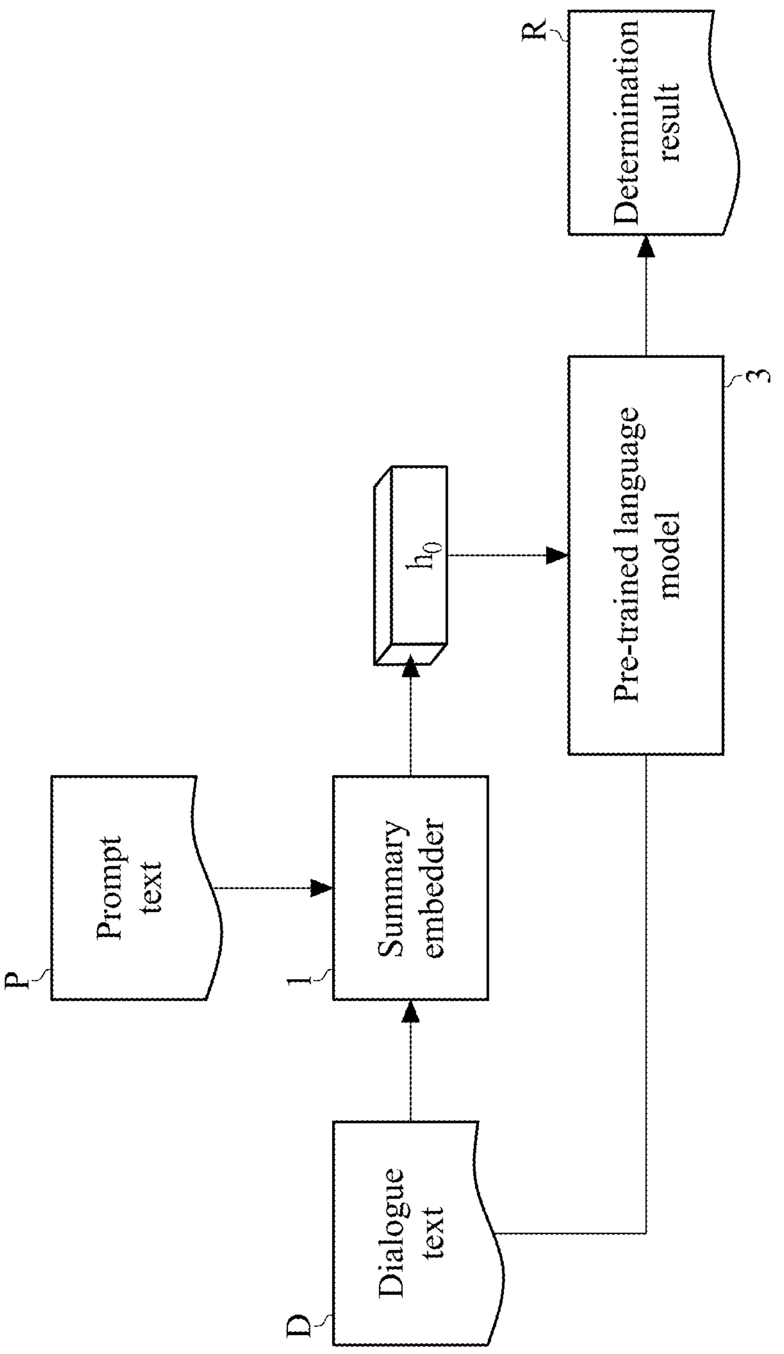
FIG. 1 is a model architecture diagram for determining logicality of dialogue sentences according to an embodiment of the present disclosure.

FIG. 1 is a model architecture diagram for determining logicality of dialogue sentences according to an embodiment of the present disclosure. As shown in FIG. 1, the model includes a summary embedder 1 and a pre-trained language model 3. The summary embedder 1 generates a first vector $h_0$ according to a dialogue text D and a prompt text P, and the pre-trained language model 3 generates a determination result R according to the dialogue text D and the first vector $h_0$.

Figure 2:
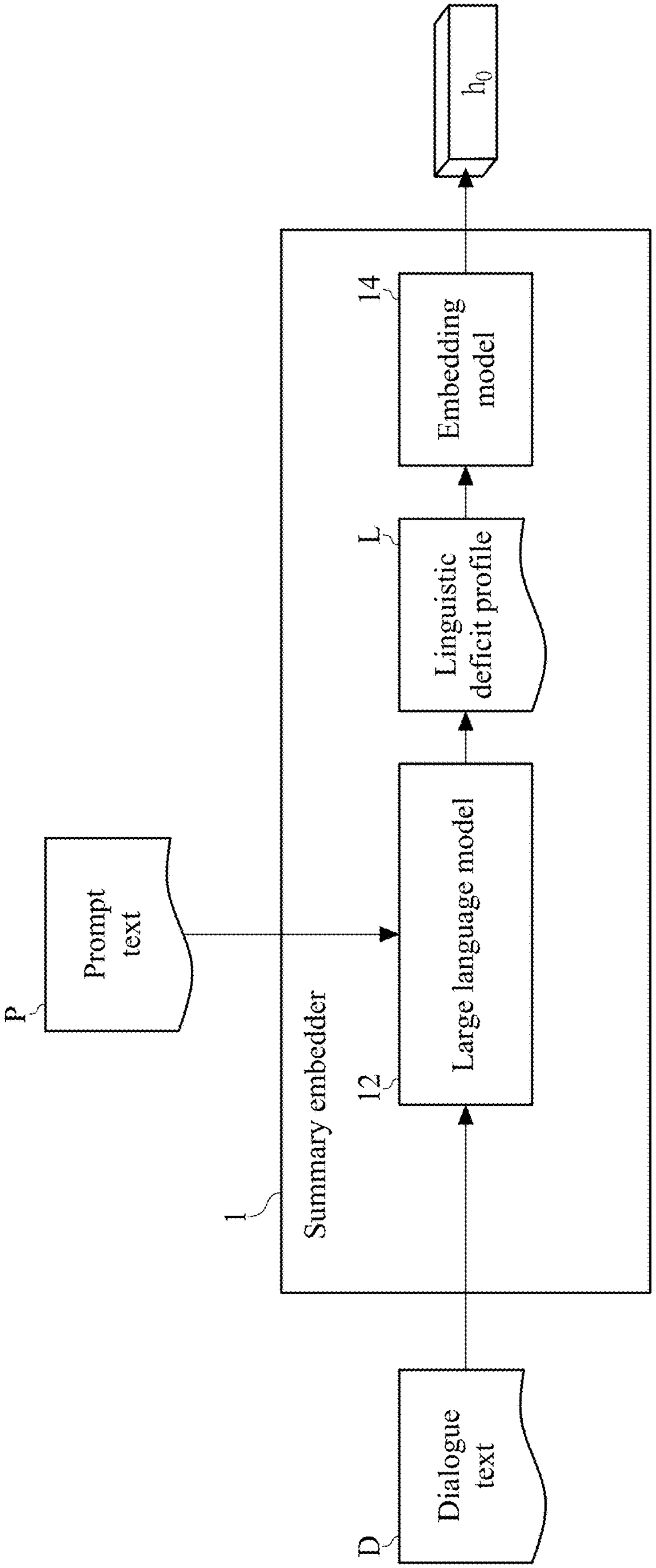
FIG. 2 is an internal architecture diagram of the summary embedder according to an embodiment of the present disclosure.

FIG. 2 is an internal architecture diagram of the summary embedder 1 according to an embodiment of the present disclosure. As shown in FIG. 2, the summary embedder 1 includes a large language model 12 and an embedding model 14. The large language model 12 generates a linguistic deficit profile L according to the dialogue text D and the prompt text P. The embedding model 14 generates the first vector $h_0$ according to the linguistic deficit profile L.

Figure 3:
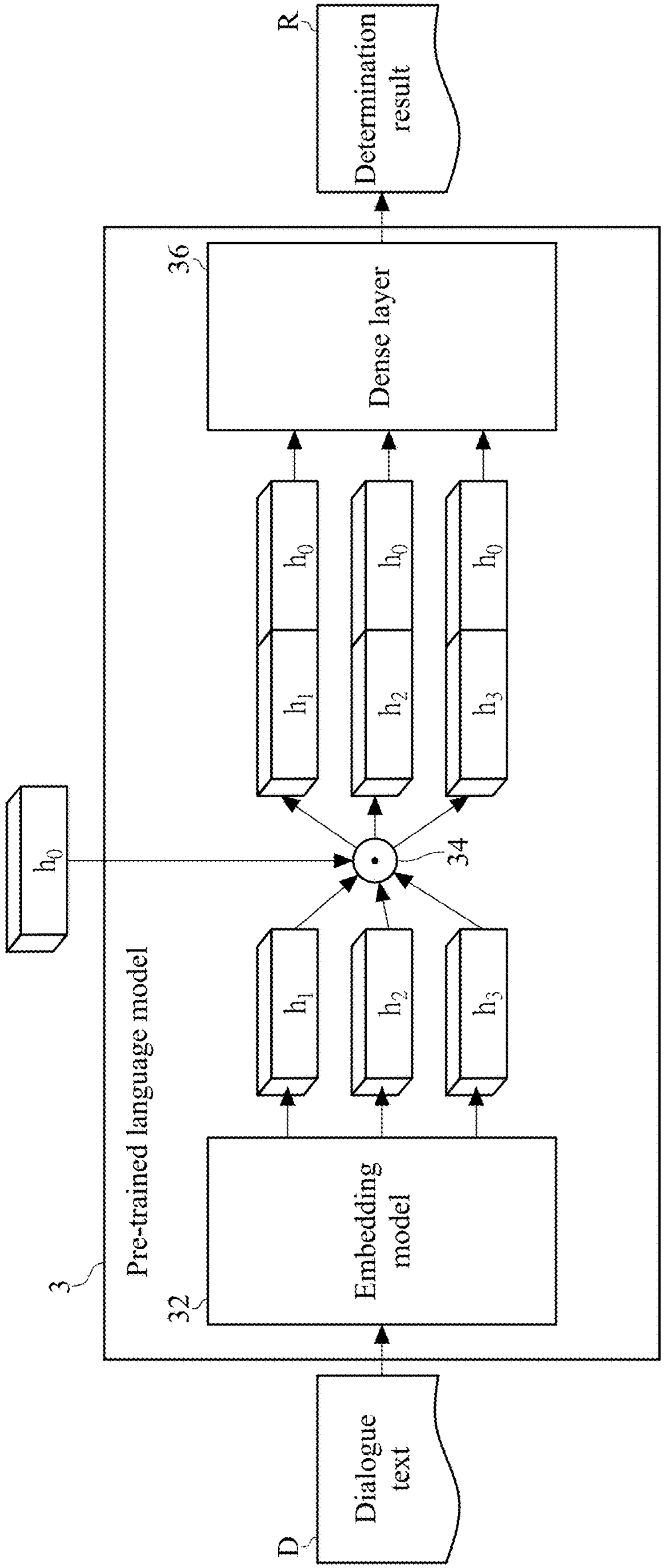
FIG. 3 is an internal architecture diagram of the pre-trained language model according to an embodiment of the present disclosure.

FIG. 3 is an internal architecture diagram of the pre-trained language model 3 according to an embodiment of the present disclosure. As shown in FIG. 3, the pre-trained language model 3 includes an embedding model 32, a concatenation function 34, and a dense layer 36. The embedding model 32 generates a plurality of second vectors $h_1$, $h_2$, and $h_3$ according to the dialogue text D, essentially performing a sentence embedding operation. In an embodiment, the transformer DNN architecture may be used to implement the embedding model 32. The concatenation function 34 concatenates the first vector $h_0$ to each of the second vectors $h_1$, $h_2$, and $h_3$, and the dense layer 36 generates the determination result R according to these second vectors $h_1$, $h_2$, and $h_3$ concatenated with the first vector $h_0$.

Figure 4:
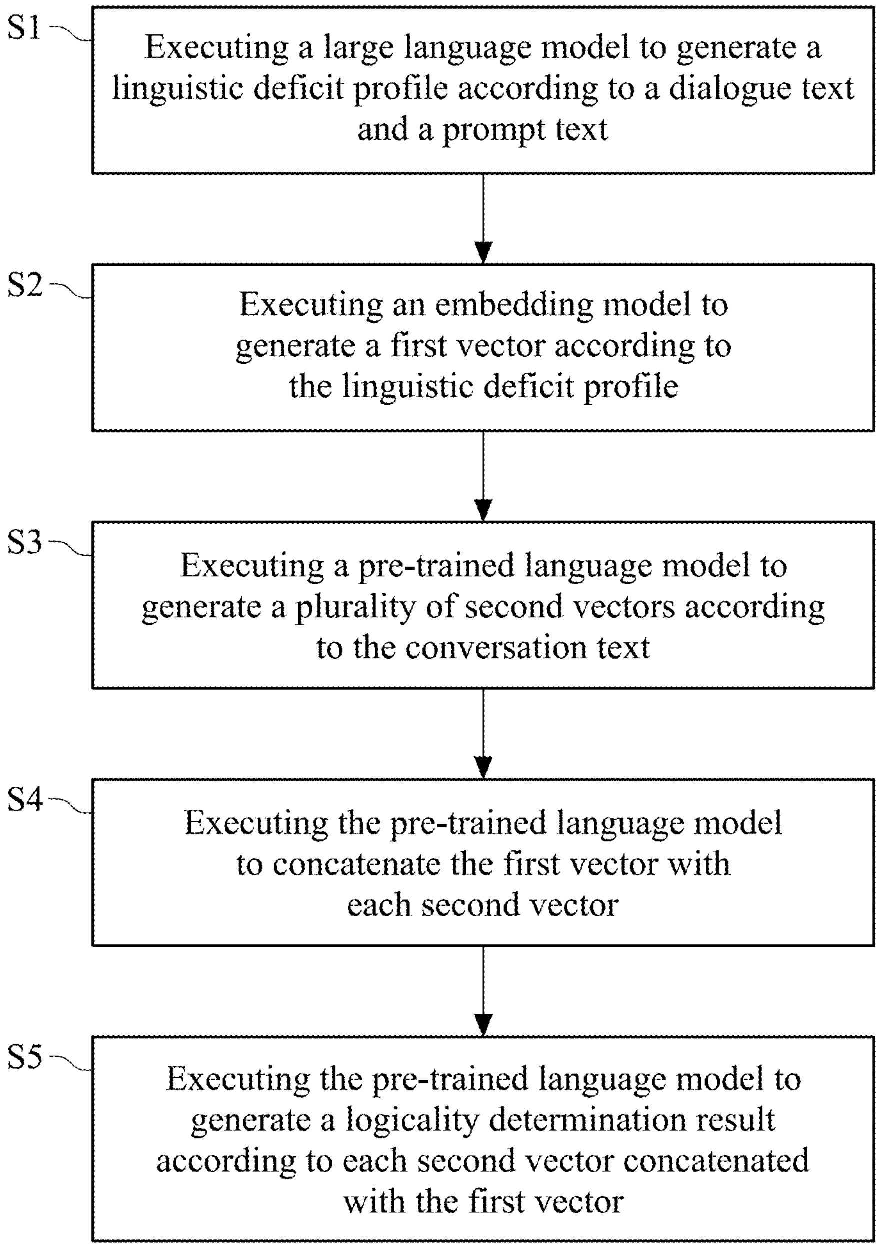
FIG. 4 is a flowchart of a method for determining logicality of dialogue sentences according to an embodiment of the present disclosure.

FIG. 4 is a flowchart of a method for determining logicality of dialogue sentences according to an embodiment of the present disclosure, including steps S1 to S5. These steps may be stored in the form of a plurality of instructions in a non-transitory computer-readable medium, wherein the plurality of instructions cause a plurality of operations when executed by a processor.

In step S1, the processor executes the large language model 12 (LLM) to generate a linguistic deficit profile L according to the dialogue text D and the prompt text P. In an embodiment, the large language model 12 uses the gpt-35-turbo engine provided by Azure OpenAI, which is a well-established and easily accessible ChatBot. In an embodiment, both the dialogue text D and the prompt text P are obtained prior to executing the method for determining logicality of dialogue sentences.

The dialogue text D may be a text file pre-stored in a storage device, loaded by the processor as an input to the large language model 12. In an embodiment, the dialogue text D is a transcript including a plurality of sentences, each beginning with a speaker identifier. Table 1 below is an example of the dialogue text D.

TABLE 1

| an example of the dialogue text D. |
|---|
| INV: OKAY |
| INV: AND THERE'S THE PICTURE |
| PAR: ALL OF THE ACTION |
| PAR: UH JUST GO AHEAD AND TELL YOU |
| INV: JUST SAY IT |
| PAR: THE MOTHER IS DRYING A PLATE |
| PAR: AND THE WATER'S SINK IS CLOGGED AND THERE'S MORE WATER GOING OVER AND IT'S SPLASHING ONTO THE FLOOR |
| PAR: AND THE S THE BOY'S FALLING OFF THE STOOL GETTING COOKIES FROM THE COOKIE JAR |
| PAR: AND THE GIRL'S PUTTING HER FINGER UP TO HER LIP WHICH MEANS I WON'T TELL OR SOMETHING LIKE THAT |
| PAR: UH SHOES ARE GETTING WET IN THE MOTHER |
| PAR: I'M LOOKING OUTSIDE BUT I DON'T SEE IT DOING ANYTHING |
| PAR: IT DOESN'T LOOK SNOWY |
| PAR: DOESN'T HAVE TOO MUCH TO TELL WITH THAT |
| PAR: THAT'S ABOUT THE ALL THE ACTION I SEE IS THE WATER SPILLING OVER AND THE BOY FALLING OFF THE STOOL |
| INV: OKAY FINE |
| PAR: I DON'T KNOW THAT SNOW IS ACTION |
| PAR: I DON'T SEE IT SNOWING |
| PAR: IT LOOKED LIGHT OUT THERE |
| INV: OKAY |
| PAR: I DON'T KNOW |

The prompt text P may be a text file pre-stored in a storage device, loaded by the processor as an input to the large language model 12. In an embodiment, the prompt text comprises four parts: an instruction, which specifies a designated object in the dialogue text D and a scenario involved in the dialogue text D; a linguistic deficit attribute description, which describes a plurality of linguistic deficit attributes and a plurality of definitions associated with the plurality of linguistic deficit attributes; a notification constraint, which specifies a permitted operation and a prohibited operation of the large language model 12; and a format constraint, which specifies an output format of the linguistic deficit profile L, with the output format including a plurality of items corresponding to the linguistic deficit attributes. Through the design of these four parts, the output format of the LLM is restricted to ensure the quality of the linguistic deficit profile L. The second part, the linguistic deficit attribute description, specifically emphasizes the categories of clinically relevant information. In previous work, linguistic deficits have been identified as measurable tasks, including anomia, dysfluency, and agrammatism. However, these attributes may not be comprehensive enough to generate the linguistic deficit profile L. In this circumstance, the present disclosure introduces 13 linguistic deficit attributes by extending these measurable tasks and querying the LLM for refined definitions of the attributes. The derived attributes include: empty speech, trailing off speech, circumlocution in speech, word/phrase revision, word/phrase repetition, telegraphic speech, misuse of pronouns, poor grammar, hesitation and pauses, lack of narrative coherence, and limited recall of details, simplified sentence structure, and difficulty organizing descriptions. Table 2 below is an example of the prompt text P.

TABLE 2

| an example of the prompt text P. |
|---|
| Instruction:<br>Given is a dialogue of a participant (PAR) going through with the Cookie Thief test for Alzheimer's disease measurement where an investigator (INV) is also engaged, you need to detect if the subject has the following defined linguistic deficits. Analyze the dialogue provided and identify if PAR exhibits any of the linguistic deficit problems mentioned. If problems are detected, fill in the answering sheet accordingly. If not, keep the sheet blank. Only analyze what appears in the dialogue, not the psychological definition. Keep the summary short and precise.<br>Linguistic deficit attribute<br>Defined 13 linguistic deficit problems:<br>empty speech, trailing off speech, circumlocution in speech, word/phrase revision, word/phrase repetition, telegraphic speech, misuse of pronouns, poor grammar, hesitation and pauses, lack of narrative coherence, limited recall of details, simplified sentence structure, difficulty organizing description<br>Constraint (Note):<br>1. Empty speech:<br>Definition: Eloquent articulation lacking the expression of meaningful information.<br>2. Trailing off speech:<br>Definition: dropping speech, when the last few words in an utterance become barely audible.<br>3. Circumlocution in speech:<br>Definition: circumlocution of words/concepts within an utterance. experiencing difficulty finding appropriate words, leading to pauses or circumlocutions.<br>4. Word/phrase revision:<br>Definition: reviewing and making changes to individual words or phrases within a piece of written content.<br>5. Word/phrase repetition:<br>Definition: same word or phrase is used multiple times within a short span of text<br>6. Telegraphic speech:<br>Definition: a style of communication that is concise and stripped down to the essential words, similar to the simplicity seen in telegrams.<br>7. Misuse of pronouns:<br>Definition: using pronouns incorrectly in a sentence, which can result in confusion or ambiguity about the intended subject or object.<br>8. Poor grammar:<br>Definition: incorrect or non-standard use of the rules and structures of a language.<br>9. Hesitation and pauses:<br>Definition: Frequent interruptions in speech with pauses or hesitations.<br>10. Lack of narrative coherence:<br>Definition: refers to a situation where a story lacks clarity, logical progression, or a cohesive structure. struggling to organize descriptions logically and coherently, disrupting the flow of the narrative.<br>11. Limited recall of details:<br>Definition: Difficulty in remembering and expressing specific details.<br>12. Simplified Sentence Structure:<br>Definition: The use of uncomplicated and straightforward sentence constructions, often with shorter and clearer syntax. This can be a linguistic feature observed in individuals with cognitive impairments, including Alzheimer's disease.<br>13. Difficulty Organizing Description:<br>Definition: Challenges in arranging information or events coherently and logically when providing a narrative or describing an event. This difficulty may lead to disjointed or fragmented storytelling, making it harder for the listener to follow the sequence of events. |

TABLE 2-continued

| an example of the prompt text P. |
|---|
| Constraint (Format): |
| Detecting problem results: |
| Empty speech: |
| Trailing off speech: |
| Circumlocution in speech: |
| Word/phrase revision: |
| Word/phrase repetition: |
| Telegraphic speech: |
| Misuse of pronouns: |
| Poor grammar: |
| Hesitation and pauses: |
| Lack of narrative coherence: |
| Limited recall of details: |
| Simplified Sentence Structure: |
| Difficulty Organizing Description: |
| Summary: |

In an embodiment, to stabilize the response, the processor submits a follow-up prompt, "Please answer the sheet" after sending the prompt text P as shown in Table 2. This is done to ensure that the output format of the large language model 12 meets expectations and to obtain the final linguistic deficit profile L. Table 3 shows a partial example extracted from the linguistic deficit profile L. Many hesitations and pauses are detected because the word "uh" frequently shows up in the dialogue. The lack of coherence can be detected from judging the dialogue. The term "I don't know" signifies limited recall of details by the participant. Additionally, as shown in the example in Table 3, the output of the large language model 12 includes: "Example," which directly extracts the detected sentence from the dialogue text D, and "Description," which is the explanation provided by the large language model 12 for detecting this linguistic deficit attribute.

TABLE 3

| an example of linguistic deficit profile. | |
|---|---|
| Hesitation and pauses | Example:<br>"UH JUST GO AHEAD AND TELL YOU"<br>"UH SHOES ARE GETTING WET IN THE MOTHER"<br>"I DON'T KNOW" |
| Lack of narrative coherence | Description:<br>The description seem disjointed and fragmented. |
| Limited recall of details | Examples:<br>"I DON'T KNOW THAT SNOW IS ACTION"<br>"I DON'T SEE IT SNOWING" |

In step S2, the processor executes the embedding model 14 to generate the first vector $h_0$ according to the linguistic deficit profile L. In an embodiment, the embedding model 14 is text-embedding-ada-002, which is a text embedder used to generate a 1536-dimensional attribute embedding $$h_a^i \in R^{1536},$$

where 1536 is the default dimension of text-embedding-ada-002; $i \in \{1 \ldots 14\}$, since there are 14 fields in the format constraints. Then, these attribute embeddings undergo a max pooling operation and are connected to a dense layer (with a size of 512) to obtain the first vector $h_0 \in R^{d_s}$, where $d_s=512$. This process selects the most salient attributes across all attribute embeddings and converts them into a more compact feature representation. In other embodiments, the architecture of the embedding model 14 is a transformer.

In step S3, the processor executes the embedding model 32 in the pre-trained language model to generate a plurality of second vectors $h_1$, $h_2$, and $h_3$ according to the dialogue text D. Please refer to FIG. 2 and Table 1. The pre-trained language model 3 is associated with the Bidirectional Encoder Representations from Transformers (BERT) technique and uses the configuration provided by HuggingFace. In an embodiment, the pre-trained language model 3 employs the AdamW optimizer with a learning rate set to $2e^{-5}$ and is trained for 4 epochs. In an embodiment, ALBERT: A Lite BERT for Self-supervised Learning of Language Representations is used as the backbone to handle the tokenized textual input obtained from the transcript (i.e., dialogue text D), which corresponds to the second vectors $h_1$, $h_2$, and $h_3$. The ALBERT network is an efficient BERT-like model with enhanced capability for handling long paragraphs.

In step S4, the processor executes the concatenation function 34 in the pre-trained language model 3 to concatenate each second vector with the first vector. Specifically, for each second vector $h_1, h_2, h_3 \in R^{d_h}$, where $d_h=768$, the concatenation function 34 appends the first vector $h_0$ to each of the second vectors $h_1$, $h_2$, and $h_3$, as shown in FIG. 3. This augments the feature space in a personal profile-aware manner.

In step S5, the processor executes the dense layer 36 in the pre-trained language model 3 to generate a logicality determination result R according to each first vector concatenated with the second vectors. In one embodiment, a two-layer dense layer 36 is used, with sizes of 640 and 2, respectively, ultimately outputting the logicality determination result R for each sentence: logically normal or logically abnormal.

In an embodiment, after step S5, based on the logicality determination results R of all sentences, a majority voting method can be used to determine whether the participant is logically normal or logically abnormal, thereby further inferring whether the participant has Alzheimer's disease.

Figure 5:
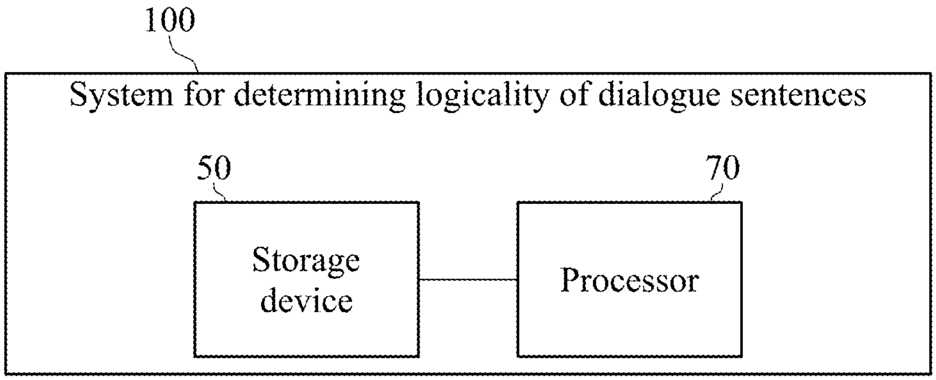
FIG. 5 is an architecture diagram of a system for determining logicality of dialogue sentences according to an embodiment of the present disclosure.

FIG. 5 is an architecture diagram of a system for determining logicality of dialogue sentences according to an embodiment of the present disclosure. As shown in FIG. 5, the system 100 for determining logicality of dialogue sentences includes a storage device 50 and a processor 70.

The storage device 50 is configured to store the aforementioned non-transitory computer-readable medium. In an embodiment, the storage device 50 may be implemented using at least one of the following examples: flash memory, hard disk drive (HDD), solid-state drive (SSD), dynamic random-access memory (DRAM), static random-access memory (SRAM), or other non-volatile memory. However, the present disclosure is not limited to these examples.

The processor 70 is electrically connected to the storage device 50 to load the plurality of instructions recorded in the non-transitory computer-readable medium, thereby executing the method for method for determining logicality of dialogue sentences according to an embodiment of the present disclosure. In an embodiment, the processor 70 may be implemented using at least one of the following examples: a personal computer, a network server, a central processing unit (CPU), a graphics processing unit (GPU), a microcontroller (MCU), an application processor (AP), a field-programmable gate array (FPGA), an application-specific integrated circuit (ASIC), a system on a chip (SOC), a deep learning accelerator, or any electronic device with similar functionality. The present disclosure does not limit the hardware type of the processor 70.

In view of the above, the core concept of the present disclosure is augmenting the information of text-form input by LLM for the downstream tasks. To this end, the present disclosure proposes a summary embedder to generate both the linguistic deficit profile and performance augmenting embedding. The performance augmenting embedding improves the accuracy of the downstream machine learning model, and the linguistic deficit profile explains the issues with the participants' logicality. The model and method proposed in the present disclosure may quickly detect the logicality of participants' sentences, with the required input being only the dialogue transcribed in text form. The output of the present disclosure is a logicality determination result with a linguistic deficit profile.

What is claimed is:

1. A method for determining logicality of dialogue sentences, performed by a processor and comprising:
- executing a large language model to generate a linguistic deficit profile according to a dialogue text and a prompt text;
- executing an embedding model to generate a first vector according to the linguistic deficit profile;
- executing a pre-trained language model to generate a plurality of second vectors according to the dialogue text;
- executing the pre-trained language model to concatenate the first vector with each of the plurality of second vectors; and
- executing the pre-trained language model to generate a logicality determination result according to each of the plurality of second vectors concatenated with the first vector.

2. The method for determining logicality of dialogue sentences of claim 1, wherein the prompt text comprises:
- an instruction configured to specify a designated object in the dialogue text and a scenario involved in the dialogue text;
- a linguistic deficit attribute description configured to describe a plurality of linguistic deficit attributes and a plurality of definitions associated with the plurality of linguistic deficit attributes;
- a notification constraint configured to specify a permitted operation and a prohibited operation of the large language model; and
- a format constraint configured to specify an output format of the linguistic deficit profile, with the output format including a plurality of items corresponding to the plurality of linguistic deficit attributes.

3. The method for determining logicality of dialogue sentences of claim 1, wherein the pre-trained language model is associated with Bidirectional Encoder Representations from Transformers.

4. The method for determining logicality of dialogue sentences of claim 1, wherein the embedding model is text-embedding-ada-002.

5. The method for determining logicality of dialogue sentences of claim 1, wherein the large language model is gpt-35-turbo engine.

6. A non-transitory computer-readable medium, configured to store a plurality of instructions, wherein a plurality of operations is caused when the plurality of instruction is executed by a processor, and the plurality of instruction comprises:
- executing a large language model to generate a linguistic deficit profile according to a dialogue text and a prompt text;
- executing an embedding model to generate a first vector according to the linguistic deficit profile;
- executing a pre-trained language model to generate a plurality of second vectors according to the dialogue text;
- executing the pre-trained language model to concatenate the first vector with each of the plurality of second vectors; and
- executing the pre-trained language model to generate a logicality determination result according to each of the plurality of second vectors concatenated with the first vector.

7. The non-transitory computer-readable medium of claim 6, wherein the prompt text comprises:
- an instruction configured to specify a designated object in the dialogue text and a scenario involved in the dialogue text;
- a linguistic deficit attribute description configured to describe a plurality of linguistic deficit attributes and a plurality of definitions associated with the plurality of linguistic deficit attributes;
- a notification constraint configured to specify a permitted operation and a prohibited operation of the large language model; and
- a format constraint configured to specify an output format of the linguistic deficit profile, with the output format including a plurality of items corresponding to the plurality of linguistic deficit attributes.

8. The non-transitory computer-readable medium of claim 6, wherein the pre-trained language model is associated with Bidirectional Encoder Representations from Transformers.

9. The non-transitory computer-readable medium of claim 6, wherein the embedding model is text-embedding-ada-002.

10. The non-transitory computer-readable medium of claim 6, where the large language model is gpt-35-turbo engine.

* * * * *